United States Patent Office

3,702,830
Patented Nov. 14, 1972

3,702,830
STABILIZER SYSTEM
John Bohemen, Leatherhead, England, assignor to BP Chemicals Limited, London, England
No Drawing. Filed Sept. 21, 1970, Ser. No. 74,206
Claims priority, application Great Britain, Oct. 14, 1969, 50,385/69
Int. Cl. B01j 1/16
U.S. Cl. 252—404        7 Claims

ABSTRACT OF THE DISCLOSURE

A synergistic stabilizer system comprising a mixture of (a) a benzoquinone compound selected from benzoquinone or a benzoquinone derivative containing at least one electron withdrawing substituent and (b) a phenolic compound having a transfer constant, as determined in monomeric vinyl acetate, at least 10 times greater than that of phenol. The stabilizer system is particularly useful for inhibiting polymerisation of ethylenically unsaturated monomers having negative Alfrey-Price $e$ values and Q values less than 2, for example vinyl acetate.

---

The present invention relates to a synergistic stabilizer system. It particularly relates to a stabilizer system for use in inhibiting the polymerisation of ethylenically unsaturated monomers having negative Alfrey-Price $e$ values and Q values less than about 2 (See J. Polymer Science, 1961, 54, 411).

It is known that many ethylenic monomers form undesirable polymer during preparation, purification and storage. Although a large variety of inhibitors are in common use many of these rely on primary inhibition by oxygen. However the presence of oxygen is often undesirable for example because of peroxide formation and subsequent decomposition, and under these circumstances the choice of inhibitor is restricted to compounds such as quinones and nitroso compounds which react directly with free radicals. In certain processes a further restriction on the choice of inhibitor may be necessary. For example, the presence of nitrogen containing compounds may deactivate some of the catalysts used in the production of vinyl acetate from ethylene.

It is an object of this invention to provide effective stabilizer systems which operate in the absence of free oxygen.

Accordingly the present invention is a synergistic stabilizer system which comprises a mixture of (a) a benzoquinone compound selected from benzoquinone or a benzoquinone derivative containing at least one electron withdrawing substituent and (b) a phenolic compound having a relatively high transfer constant as hereinafter defined.

The invention is further a method for stabilizing ethylenically unsaturated monomers having negative Alfrey-Price $e$ values and Q values less than 2 which comprises adding to the monomer a synergistic stabilizer system comprising a mixture of (a) a benzoquinone compound selected from benzoquinone or a benzoquinone derivative containing at least one electron withdrawing substituent and (b) a phenolic compound having a relatively high transfer constant as hereinafter defined.

The stabilizer system is particularly effective for the stabilization of vinyl acetate (Alfrey-Price $e$ value$=-0.22$ and Q value$=0.026$).

Examples of electron withdrawing substituents are halogen and cyano groups. Preferably they are chloro groups. The benzoquinone compounds are preferably p-benzoquinone itself or chloranil which is tetrachloro-p-benzoquinone.

By a phenolic compound having a relatively high transfer constant is meant throughout this specification a phenolic compound having a transfer constant, as determined in monomeric vinyl acetate, at least 10 times greater than that of phenol.

Preferably the phenolic compound is a secondary or tertiay alkyl substituted phenolic compound, for example tertiary-butylcatechol.

The molar proportions of the benzoquinone compound to the phenolic compound influence the resultant synergistic effect. Suitably the mole ratio of the benzoquinone compound to the phenolic compound in the mixture is in the range from 1:10 to 10:1. Preferably the compounds are present in the mixture in substantially equimolar proportions.

The concentration of stabilizer system added to the monomer is suitably in the range from 10 to 10,000 p.p.m. by weight although concentrations outside this range can be used if desired.

Stabilizer systems according to the present invention and other stabilizers by way of comparison are illustrated in the following examples. The effectiveness of stabilizer systems at 50.0° C. was determined dilatometrically.

The abbreviation A.B.N. denotes azobisisobutyronitrile, which in a polymerisation initiator, and V.A. denotes vinyl acetate monomer.

DETERMINATION OF INDUCTION PERIODS

A.B.N. was dissolved in vinyl acetate monomer to give a 0.01 molar solution which was then sealed in a dilatometer under vacuum. The time required for 0.1% monomer to polymerise at 50.0° C. was 7 minutes. All the induction periods throughout these examples have been taken as the time to reach 0.1% polymerisation in the presence of inhibitor minus the corresponding time obtained in the absence of inhibitor, i.e., 7 minutes, using the A.B.N. initiated vinyl acetate solution in each case.

EXAMPLE SERIES 1

(a) p-Benzoquinone (23 p.p.m. by weight: $2\times10^{-4}$ molar) was dissolved in the initiated vinyl acetate solution prepared as above and the time taken for 0.1% polymerisation at 50.0° C. determined using the dilatometer as before.

The experiment was repeated (b) using p-tertiary-butylcatechol (36 p.p.m. by weight: $2\times10^{-4}$ molar) instead of the p-benzoquinone and (c) using p-benzoquinone (23 p.p.m.: $2\times10^{-4}$ molar) and p-tertiary-butylcatechol (36 p.p.m.: $2\times10^{-4}$ molar) together. The results are shown in Table 1 below.

TABLE 1

| Example No | Benzoquinone | | Tert-Butylcatechol | | Induction period (minutes) | Synergistic effect as additional induction period (minutes) |
|---|---|---|---|---|---|---|
| | p.p.m. | Molarity | p.p.m. | Molarity | | |
| 1a | 23 | $2\times10^{-4}$ | | | 58 | |
| 1b | | | 36 | $2\times10^{-4}$ | 10 | |
| 1c | 23 | $2\times10^{-4}$ | 36 | $2\times10^{-4}$ | 114 | 46 |

It is evident from Table 1 that the mixed inhibitors have given an additional induction period of 46 minutes due to the synergistic effect since the predicted induction period would have been 10+58 minutes i.e., 68 minutes rather than 114 minutes obtained in practice.

EXAMPLE SERIES 2

Various ratios of benzoquinone to tert-butylcatechol were tested using the procedure described in Example Series 1. The results of these experiments, together with the relevant induction periods for tert-butylcatechol when used as the sole inhibitor, are given in Table 2.

TABLE 2

| | Concentration of tert-butylcatechol | | Induction period, min. | | |
|---|---|---|---|---|---|
| Example | $10^{-4}$ M | P.p.m. by wt. | With tert-butylcate-chol only | With tert-butylcate-chol plus $2\times10^{-4}$ M benzo-quinone | Synergistic effect as additional inhibition period, min. |
| 2a | 0.2 | 4 | 10 | 75 | 7 |
| 2b | 1.0 | 18 | 11 | 101 | 32 |
| 2c | 2.0 | 36 | 10 | 114 | 46 |
| 2d | 8.0 | 142 | 27 | 148 | 63 |
| 2e | 20.0 | 356 | 29 | 153 | 66 |

It is clear that the optimum synergistic effect was obtained with approximately equimolar amounts of benzoquinone and tert-butylacatechol.

EXAMPLE SERIES 3

The induction period (168 mins.) for A.B.N. initiated V.A. containing $2\times10^{-4}$ M (53 p.p.m.) chloranil was determined by the procedure of Example Series 1. Various ratios of chloranil to phenolic compound were tested, the phenolic compounds in this case being tert-butylcatechol (Examples 3a–3c) and phenol itself (Examples 3d). The phenolic compounds were also tested in the absence of chloranil. The results are shown in Table 3.

It is clear that the optimum synergistic effect was obtained with approximately equimolar amounts of chloranil and tert-butylcatechol. This example also shows that with a phenolic compound such as phenol, which has a relatively low transfer constant, there was no synergism.

Some other phenolic compounds having relatively high transfer constants are for example p-methoxy phenol, 2,3,4,6-tetramethyl phenol, 2,6-diisopropyl phenol and catechol.

I claim:

1. A synergistic stabilizer system containing as essential ingredients a mixture of effective stabilizing amounts of (a) benzoquinone or chloranil and (b) tert.-butyl catechol, p-methoxy phenol, 2,3,4,6-tetramethyl phenol, 2,6-diisopropyl phenol or catechol, the mole ratio of (a) to (b) being from 1:10 to 10:1.

2. A synergistic stabilizer as dened in claim 1 wherein compounds (a) and (b) are in substantially equimolar proportions.

3. A synergistic stabilizer system containing as essential ingredients a mixture of effective stabilizing amounts of (a) benzoquinone or chloranil and (b) tert. butyl catechol, the mole ratio of (a) to (b) being from 1:10 to 10:1.

4. A synergistic stabilizer system as defined in claim 3 wherein compounds (a) and (b) are in equimolar proportions.

5. A method for stabilizing vinyl acetate monomer comprising adding to the monomer effective amounts of (a) benzoquinone or chloranil and (b) tertiary butyl catechol, p-methoxy phenol, 2,3,4,6-tetramethyl phenol, 2,6-diisopropyl phenol or catechol, the mole ratio of (a) to (b) being from 1:10 to 10:1.

6. A method as defined in claim 5 wherein compound (a) is benzoquinone or chloranil and compound (b) is tertiary butyl catechol.

7. A method as defined in claim 5 wherein from 10 to 10,000 p.p.m. of compounds (a) and (b) are added to the vinyl acetate based on the weight of vinyl acetate.

TABLE 3

| | Phenolic compound | | | Induction period, min. | | Synergistic effect as additional inhibition period, min. |
|---|---|---|---|---|---|---|
| | | Concentration | | | With phenolic compound plus $2\times10^{-4}$ M chloranil | |
| Example | Name | $10^{-4}$ M | P.p.m. by wt. | With phenolic compound only | | |
| 3a | tert-Butylcatechol | 1.0 | 18 | 11 | 218 | 39 |
| 3b | do | 2.0 | 36 | 10 | 273 | 95 |
| 3c | do | 4.0 | 71 | 6 | 258 | 84 |
| 3d | Phenol | 2.0 | 20 | 0 | 149 | (−19) |

References Cited

UNITED STATES PATENTS

| | | | |
|---|---|---|---|
| 2,389,370 | 11/1945 | Koch | 252—404 |
| 2,455,745 | 12/1948 | Erickson | 260—650 R |
| 2,455,746 | 12/1948 | Erickson | 260—650 R |
| 2,627,510 | 2/1953 | Parker | 260—865 |
| 2,992,246 | 7/1961 | Frantz | 260—410.9 |
| 2,993,903 | 7/1961 | Kraus | 260—290 |
| 3,062,863 | 11/1962 | Fernholz et al. | 260—476 |
| 3,296,299 | 1/1967 | Olgahi et al. | 260—488 |
| 3,467,696 | 9/1969 | Reyunosuke et al. | 260—488 |

OTHER REFERENCES

Kharasch et al.: "The Mechanism, etc." Journal of Organic Chemistry, vol. 19 (1959), p. 1977.

JOHN D. WELSH, Primary Examiner

U.S. Cl. X.R.

260—488

UNITED STATES PATENT OFFICE
CERTIFICATE OF CORRECTION

Patent No. 3,702,830          Dated November 14, 1972

Inventor(s) John Bohemen

It is certified that error appears in the above-identified patent and that said Letters Patent are hereby corrected as shown below:

Column 3, line 27, "tert-butylacatechol" should read -- tert-butylcatechol -- . Claim 2, line 1, change "dened" to read -- defined -- .

Signed and sealed this 15th day of May 1973.

(SEAL)
Attest:

EDWARD M. FLETCHER, JR.          ROBERT GOTTSCHALK
Attesting Officer                Commissioner of Patents